(12) United States Patent
Hashim

(10) Patent No.: US 7,735,816 B2
(45) Date of Patent: Jun. 15, 2010

(54) CARVE SMART

(76) Inventor: Paul R. Hashim, 3801 Pegasus Dr., Suite. 101, Bakersfield, CA (US) 93308

(*) Notice: Subject to any disclaimer, the term of this patent is extended or adjusted under 35 U.S.C. 154(b) by 171 days.

(21) Appl. No.: 12/000,112

(22) Filed: Dec. 10, 2007

(65) Prior Publication Data

US 2009/0146353 A1    Jun. 11, 2009

(51) Int. Cl.
*B23Q 3/00* (2006.01)
*A47J 47/20* (2006.01)
*A47J 47/00* (2006.01)

(52) U.S. Cl. .................... 269/289 R; 269/302.1
(58) Field of Classification Search ............ 269/289 R, 269/302.1, 13, 15
See application file for complete search history.

(56) References Cited

U.S. PATENT DOCUMENTS

| | | | | |
|---|---|---|---|---|
| 5,366,208 A * | 11/1994 | Benjamin | ............... | 269/13 |
| 5,865,105 A * | 2/1999 | Pepelanov | ............... | 99/446 |
| 5,938,185 A * | 8/1999 | Kletter | ............... | 269/289 R |
| 6,386,531 B1 * | 5/2002 | Prosser | ............... | 269/15 |
| 6,722,644 B1 * | 4/2004 | Prosser | ............... | 269/289 R |
| 6,994,334 B2 * | 2/2006 | Jones et al. | ............... | 269/289 R |
| 7,422,201 B2 * | 9/2008 | Pearl et al. | ............... | 269/289 R |
| 2005/0040580 A1 * | 2/2005 | Davis | ............... | 269/289 R |
| 2005/0110203 A1 * | 5/2005 | Loo | ............... | 269/289 R |
| 2009/0146353 A1 * | 6/2009 | Hashim | ............... | 269/13 |

\* cited by examiner

*Primary Examiner*—Lee D Wilson

(57) ABSTRACT

An improved cutting surface and detachable containment drip pan that is capable of simultaneously providing a cutting surface with drip holes and a detachable drip pan for containment of those juices comprising a single inventive concept. The carving system comprises a polymeric plastic cutting surface, with circular and elongated drip holes spaced at intervals along the cutting surface with legs located on the under side of the cutting surface for support and to secure the cutting surface to the containment drip pan while in use for the containment of juices seeping through the drip holes while carving. A pour spout is oriented in one of the corners of the containment drip pan to pour out the juices with ease with the carving surface is attached or not attached to the containment drip pan.

9 Claims, 2 Drawing Sheets

DRAWING DISCLOSURE
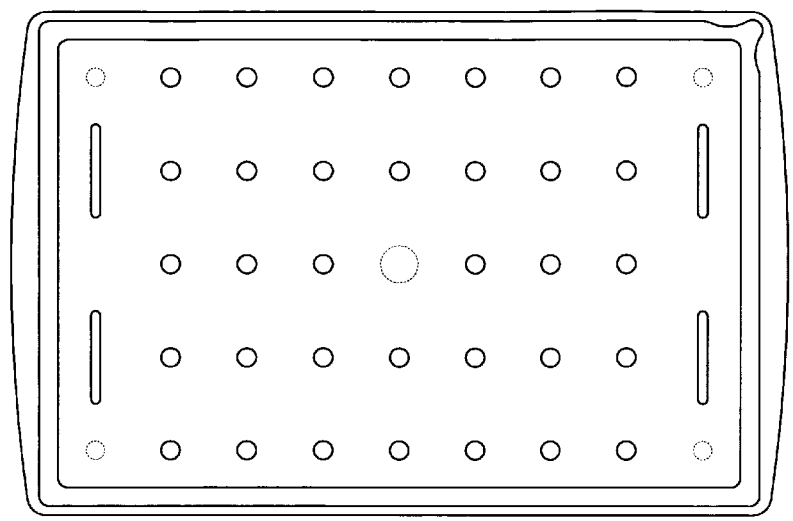
FIG. 1
FIG. 2
    
FIG. 3    FIG. 4

CARVE SMART

BACKGROUND OF THE INVENTION

1. Field of Invention

The present invention relates generally to a carving surface attached to a containment drip pan more specifically it relates to a carving system for containment of juices when carving meats, poultry, or fish. Current carving surfaces are not designed for retaining drippings while in the act of carving. There are various types of conditions in which these drippings are to be retained and utilized.

However, conventional carving surfaces are not useful for preserving these drippings and are wasted. Hence there is a need for a carving system that is designed to contain drippings from carvings.

2. Description of the Prior Art

Carving devices have been in use for years. Typically, conventional carving systems are comprised of a single carving surface. The user carves meats, poultry or fish without being able to retain the drippings from the act of carving.

Conventional carving devices work fine for carving meats, poultry, or fish. However, when carving the drippings are unintentionally discarded.

While existing carving surfaces may be suitable for carving meats, poultry and fish the purpose in which they were designed are not suitable for retaining the drippings from these carvings without creating special conditions in which to save these drippings.

In these respects, the carving system according to the present invention substantially departs from the conventional concepts and designs of the prior art, and in doing so provides and a single carving system primarily developed for the purpose of containment of those drippings.

SUMMARY OF THE INVENTION

In view of the foregoing disadvantages in the known types of carving surfaces now present in the prior art, the present invention provides a new carving system that can be utilized for the containment of drippings from the carvings of meat, poultry, or fish.

The general purpose of the present invention, which will be described subsequently in greater detail, is to provide a new single inventive carving system that has many advantages over existing carving surfaces.

To attain this, the present invention generally comprises an improved polymeric plastic carving board with a plurality of circular and elongated drip holes for allowing drippings from carvings to drip into an attached containment drip pan. Legs are attached to the underside of the carving board that fit precisely into depressions in the containment drip pan in order to act as a single carving unit and to create stability.

There has thus been outlined, rather broadly, the more important features of the invention in order that the detailed description therefore may be better understood, and in order that the present contribution to the art may be better appreciated.

Therefore, before describing one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that phraseology and terminology employed herein are for the purpose of the description and should be regarded as limited.

A primary object of the present invention is to provide a unique carving system that will overcome the shortcomings of the prior art devices.

Another object is to provide a carving system that can be utilized with various meats, poultry or fish.

An additional object is to provide a carving system that eliminates the need for having to provide additional means to contained drippings from carvings.

A further object is to provide a carving system that will eliminate the need for other various designs of carving surface attachments.

Another object is to provide a carving system that is simple and durable for utilization of containing drippings from carving meats, poultry or fish.

A further object is to provide a carving system that is easy to manufacture, utilizing inexpensive and readily available materials.

To accomplish the above and related objects, this invention may be embodied in the form illustrated in the accompanying drawings, attention being called to the fact however, that the drawings are illustrative only, and that changes may be made in specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein:

FIG. 1 of the drawing is a top view of the preferred embodiment of the present invention, showing the details thereof.

FIG. 2 of the drawing is a front view of the preferred embodiment of the present invention, showing the details thereof.

FIG. 3 of the drawing is a sectional view of the preferred embodiment of the present invention, showing the details thereof.

FIG. 4 of the drawing is a sectional view of the preferred embodiment of the present invention, showing the details thereof.

DESCRIPTION OF THE PREFERRED EMBODIMENTS

Figure 5:
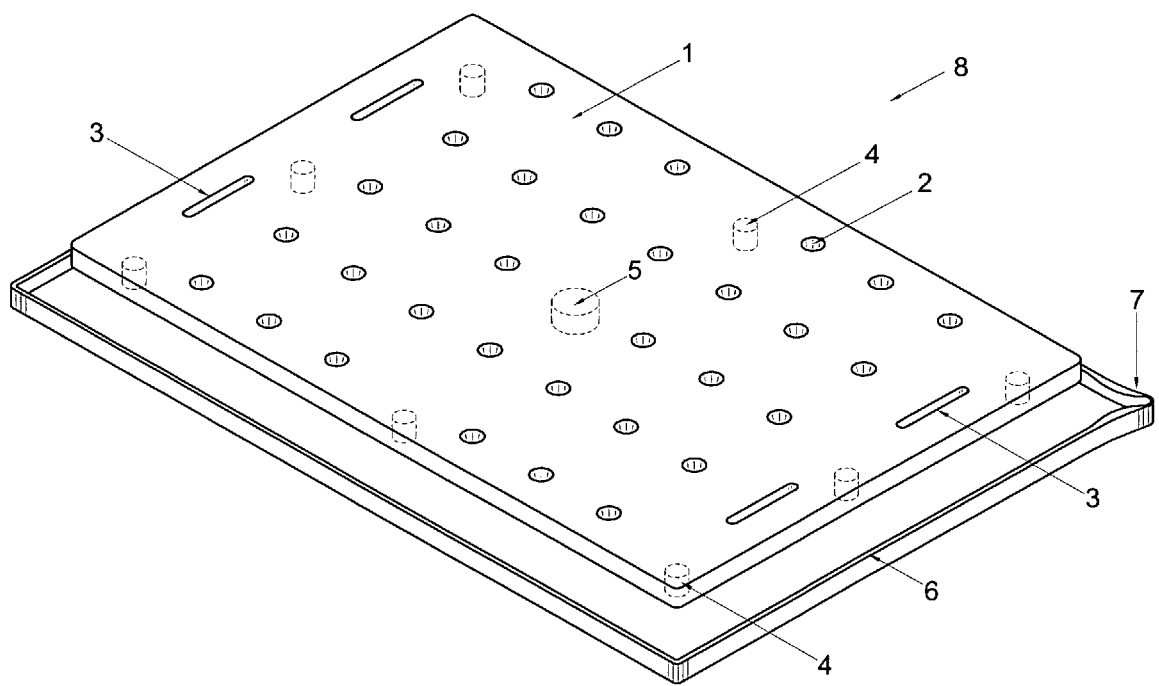
FIG. 5 of the drawing is a isometric view of the preferred embodiment of the present invention, showing the details thereof.

The details of the preferred embodiment of the present single inventive concept invention are shown in FIGS. 1-5 of the drawing. Turning to FIG. 5, The Carve Smart 8, generally comprises a detachable drip pan 6, leg supports 4, and 5, carving surface comprised of polymeric plastic 1, a plurality of circular holes 2, elongated holes 3, and pour spout 7.

I claim:

1. A device having a cutting surface and a container drip pan which is removably attached for containment of juices from carvings of meats, poultry, or fish, said cutting surface comprising:

a. a surface comprised of a plurality of drip holes;

b. wherein said container drip pan comprises a central recess and a plurality of distal recesses at a plurality of points within an aperture and on a bottom of said container drip pan with said aperture being larger than said cutting surface;

c. wherein said cutting surface further comprise leg supports for supporting the carving surface and removably attaching the cutting surface said legs supports within said plurality of recesses of the containment drip pan for the containment of juices;

d. and a pour spout oriented in one of the corners of the containment drip pan for pouring out the juices.

2. The device of claim 1, wherein said cutting surface is comprised of polymeric plastic with a plurality of circular holes and elongated holes to allow juices from carvings to seep thru the cutting surface into a detachable containment drip pan for containment.

3. The device of claim 1, wherein said cutting surface is comprised of a metal with a plurality of circular holes and elongated holes to allow juices from carvings to seep thru the cutting surface into a detachable containment drip pan for containment.

4. The device of claim 3, said containment drip pan having the bottom surface having a skid resistant bottom to secure the carving system while carving.

5. The device of claim 3, said pour spout being oriented in one of the corners of the containment pan with lips that form the spout extending slightly out and above the top of the containment pan being concaved towards a center of the pour spout and extending slightly beyond the corner of the containment pan for pouring out the juices without spilling or dripping.

6. The device of claim 1, wherein said leg supports extending out from the underside of the cutting surface and secured into position by insertion into depressions within the inside bottom of the containment drip pan for support of the cutting surface securing the containment drip pan to the carving surface.

7. The device of claim 1, wherein said containment drip pan formed of a metal.

8. The device of claim 1, wherein said containment drip pan formed of a plastic material.

9. The device of claim 1, wherein said plurality of drip holes being circular with an elongated hole forming a conical shape.

* * * * *